Patented Aug. 20, 1929.

1,724,952

UNITED STATES PATENT OFFICE.

EJNAR ALFRED MEYER, OF CLIFTON, BRISTOL, ENGLAND, ASSIGNOR TO THE FLEISCHMANN COMPANY, OF NEW YORK, N. Y., A CORPORATION OF OHIO.

MANUFACTURE OF YEAST.

No Drawing. Application filed April 30, 1927, Serial No. 188,055, and in Great Britain May 4, 1926.

This invention relates to the manufacture of bakers' yeast, and has as an object the obtaining of large yields of good quality yeast in a convenient, efficient and economical manner.

A more specific object of the present invention is to improve the heretofore known methods of manufacturing yeast, whereby yeast propagation can be carried on through extended periods without degeneration of the stock.

In the manufacture of yeast by the aeration process, it is frequently customary to use a part or all of the yeast manufactured in one fermenter as the seed or stock used for further fermentations, either in another fermenter or in the same fermenter by the so-called continuous processes, wherein the propagating period is extended, nutrients are continuously supplied to the fermenter, and yeast is separated either continuously or from time to time in a manner well-known to the art.

In either case there is usually a tendency for the yeast to degenerate, and in accordance with the principles of the present invention, it has been found that such degeneration can be effectually prevented if the type of nutrient material supplied to the yeast is changed frequently, as will be hereinafter pointed out.

An example of a manner in which the present invention can be applied is as follows:

To a dilute molasses wort of, for example, 1° to 1.5° Balling is added seed yeeast, for example, 1 lb. to 10 gallons of wort, and while aerating, a stronger wort of, for example, 10 to 15° Balling is fed into the fermenter until the proportion between the nutrients and the water has reached a desired figure, for example, a ratio 1 to 14, whereafter molasses wort of, for example, 10 to 15° Balling is slowly and substantially-continuously fed into the fermenter. A certain amount of the yeast-containing liquid is then removed from the fermenter and the yeast is separated therefrom and pressed, water being added to the fermenter in a quantity equal to the quantity of the wort removed. The cycle is then repeated.

After this process has been running for a suitable period, as for example, up to 40 hours, the feeding of the molasses-type of wort is discontinued and is replaced by the feeding of a wort which is largely derived from material other than molasses, as for example, malt, grain and malt combings. This second type of feeding is allowed to continue for a period of from 6 to 12 hours, whereupon it can in turn be replaced by the feeding of the molasses wort as was used in the beginning.

It is found that when yeast is frequently subjected to a change of nutrients, as above specified, it will maintain its growing capacity and fermenting strength for considerable periods. Obviously, instead of alternating between two kinds of food materials, other types of food materials may be used, and the use of a wort rich in vitamines has been found to be highly effective for the purpose specified.

Moreover, the changes that are made may be directed solely or particularly to a change in the ratio of proteins to carbohydrates, or solely or particularly to a change in the vitamines, or to a combination of both kinds of change, the manner of establishing such changes being well known to those skilled in the art.

Having described my invention, what I claim as new and desire to secure by Letters Patent is:

1. In a process of manufacturing yeast, including the propagation of yeast with aeration in a nutrient solution over an extended period of time, the improvement which comprises initiating the propagation of yeast with aeration in a nutrient solution comprised essentially of molasses, continuing the propagation for a period of in excess of 10 hours, withdrawing a portion of the yeast-containing liquid, adding to the remainder thereof at least an equivalent amount of an extract of cereal material, and continuing the propagation of yeast with aeration.

2. In a process of manufacturing yeast, including the propagation of yeast with aeration in a nutrient solution over an extended period of time, the improvement which comprises initiating the propagation of yeast with aeration in a nutrient solution comprised essentially of molasses, continuing the propagation for a period of in excess of 10 hours, withdrawing a portion of the yeast-containing liquid, adding to the remainder thereof at least an equivalent amount of an extract of cereal material, and continuing the propagation of yeast with aeration for a period of about six hours, and thereafter again withdrawing a portion of the yeast-containing liquid and renewing the addition of the molasses nutrient solution.

3. A process of manufacturing yeast, which comprises initiating the propagation of yeast in a dilute molasses wort of a density of 2° Balling, aerating the mixture, adding thereto a stronger molasses wort until the proportion between the nutrients and the water has reached a ratio of about 1 to 14, thereafter removing a portion of the yeast-containing liquid, adding water to the remainder to again bring it to volume, and after continuing this operation for a period in excess of 10 hours discontinuing the addition of the molasses type of wort and substituting therefor a grain extract wort, and continuing this second type of feeding for a period of about 6 hours.

4. A process of manufacturing yeast, which comprises initiating the propagation of yeast in a dilute molasses wort of a density of 2° Balling, aerating the mixture, adding thereto a stronger molasses wort until the proportion between the nutrients and the water has reached a ratio of about 1 to 14, thereafter removing a portion of the yeast-containing liquid, adding water to the remainder to again bring it to volume, and after continuing this operation for a period in excess of 10 hours discontinuing the addition of the molasses type of wort and substituting therefor a grain extract wort, continuing this second type of feeding for a period of about 6 hours, and thereafter reverting to the addition of the molasses type of wort.

In testimony whereof I affix my signature.

EJNAR ALFRED MEYER.